UNITED STATES PATENT OFFICE.

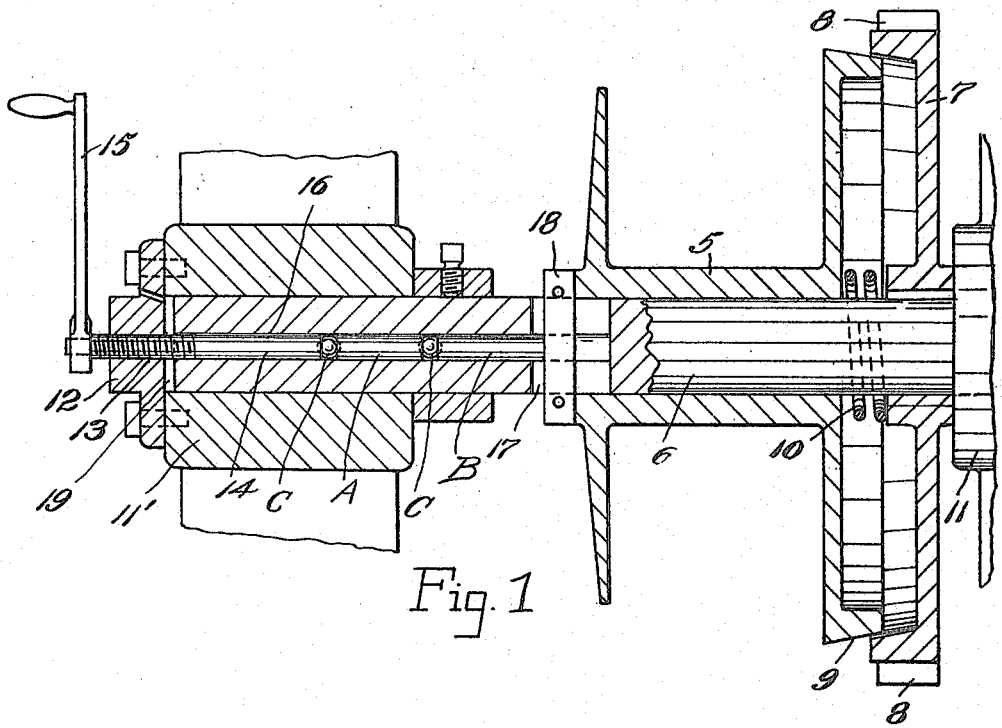

SAMUEL J. BALDWIN, OF TACOMA, AND JOSEPH W. SLY, OF EATONVILLE, WASHINGTON.

THRUST-PIN FOR WINDING-DRUMS.

1,129,441.    Specification of Letters Patent.    Patented Feb. 23, 1915.

Application filed June 13, 1914. Serial No. 844,952.

*To all whom it may concern:*

Be it known that we, SAMUEL J. BALDWIN and JOSEPH W. SLY, citizens of the United States, residing at Tacoma and Eatonville, respectively, in the county of Pierce and State of Washington, have invented certain new and useful Improvements in Thrust-Pins for Winding-Drums, of which the following is a specification.

This invention relates to improvements in devices for applying endwise movements to a frictional clutch element, such as employed in hoisting and hauling engines, to engage a normally loose drum with a power driven clutch element to render the drum operative.

The object of our invention is the provision of inexpensively constructed and efficient means whereby the friction which insues between the take-up screw and the thrust-pin of such a device is reduced to a minimum with an absence of heat thereat and with an increase in the durability of such thrust-devices and with an improvement in the operation of the engine.

With these ends in view, the invention consists in the novel construction and adaptation of devices, as will be hereinafter described and claimed.

In the accompanying drawings, Figure 1 is a longitudinal sectional view of a portion of a hauling engine with our invention applied thereto. Fig. 2 is a detail sectional view, to an enlarged scale, showing parts of the thrust-pin elements and an interposed ball which is shown in elevation.

The reference numeral 5 designates a drum loosely mounted on a shaft 6 having rigidly mounted thereon a cup frictional element 7. The latter is provided with peripheral spur-teeth 8 whereby the element is rotated by means of a pinion, not shown, to drive the shaft. Said drum is provided at one end with a cone 9 adapted to be engaged with the cup element 7 when the drum is moved axially in opposition to a spring 10 tending to yieldingly hold the drum in disengaged position with respect to the power driven clutch element 7.

The shaft 6 is journaled in bearing boxes 11 and 11¹ of the machine frame, and secured to the latter is a block 12 which is provided with a screw-threaded hole 13 and constitutes a fixed nut for a take-up screw 14 which may be operated by a handle arm 15. The screw 14 extends into an axial bore 16 of the shaft and communicates with a slot 17 extending diametrically through the shaft. Provided in said slot is a key 18 having protruding ends which are juxtaposed with the drum.

The aforedescribed parts are substantially similar to what are now commonly used in the class of machines to which the invention pertains; but in addition thereto is usually employed a thrust-pin having its ends respectively engage the take-up screw 14 and the key 18 so that when the screw is properly turned, it will exercise, through the medium of the referred to pin, motion to the key which, in turn, imparts axial movement to the drum for coupling the latter with the driving element 7.

Inasmuch as the force necessary to be applied to a thrust-pin of this character to maintain the drum in engagement is considerable, and because the screw 14 does not rotate with the shaft, the friction hitherto obtaining between the thrust-pin and the key, or the screw, has been sufficient to cause the pin to become excessively hot so as to destroy the pin and oftentimes cause it to become welded to one or the other of the parts in contact therewith.

According to the present invention, we provide a pin comprised of a plurality of spaced members A and B arranged in axial alinement in the shaft-bore 16 and interpose anti-friction balls C between said members and between the screw 14 and the adjacent member A.

The ends of the screw and of the members against which the balls bear, are each formed with a concavity D of greater radius than that of a ball, and centrally of each such depression the screw, or member, is ground, as at E, Fig. 2, to afford a socket of substantially the same curvature as the periphery of a ball. By such devices there is afforded a seat at the center of a member for a ball and surrounding the latter is an annular recess F for the admission of lubricating material to within a short distance of the axis of the pin members.

In practice, the balls are made of slightly less diameters than the shaft-bore so that when the screw is retracted the balls drop out of alinement with the pin-members, and when the screw is again utilized, the concave faces D at the ends of the pin-members will direct the balls into the sockets or seats E therefor.

The lubricant oil or grease may be supplied to the shaft bore from a chamber 19 at the end of the shaft and when the balls drop into the lubricant some of the latter will adhere to the balls to be subsequently carried by the latter into the sockets.

What we claim as our invention, is—

1. In apparatus of the class described, the combination with the shaft having an axial bore in one end thereof and a slot extending diametrically through the shaft and communicating with said bore, a clutch element secured to the shaft, a drum loosely mounted on the shaft and provided with a clutch element engageable with the aforesaid element, a key extending through said slot and engaging the drum, a nut fixedly secured to the machine-frame, and a screw engaging said nut and extending into the shaft bore, of thrust-pin devices located in the shaft-bore between said screw and the key and comprising a plurality of members having sockets in their adjacent ends, and a ball interposed between said members and adapted to seat in said sockets.

2. In apparatus of the class described, a plurality of pin members alternating with balls, said pin members being formed in their ends with concavities of greater radii than the balls and sockets formed in the centers of the respective concavities of radii corresponding with the balls.

3. In apparatus of the class described, a take-up screw and a pin member, concavities formed in the opposing ends of the screw and pin member, and a ball of less diameter than said pin member interposed between the screw and said member and arranged to seat in both of said concavities when the screw is rendered operative.

SAMUEL J. BALDWIN.
JOSEPH W. SLY.

Witnesses for Samuel J. Baldwin:
   J. M. GLOYD,
   H. H. JOHNSTON.

Witnesses for Joseph W. Sly:
   NORMAN J. BRUEN,
   J. B. CARLTON.

Copies of this patent may be obtained for five cents each, by addressing the "Commissioner of Patents, Washington, D. C."